May 27, 1947.  S. F. SHAWHAN  2,421,293
DEFROSTING METHOD AND APPARATUS
Filed April 9, 1943  2 Sheets-Sheet 1
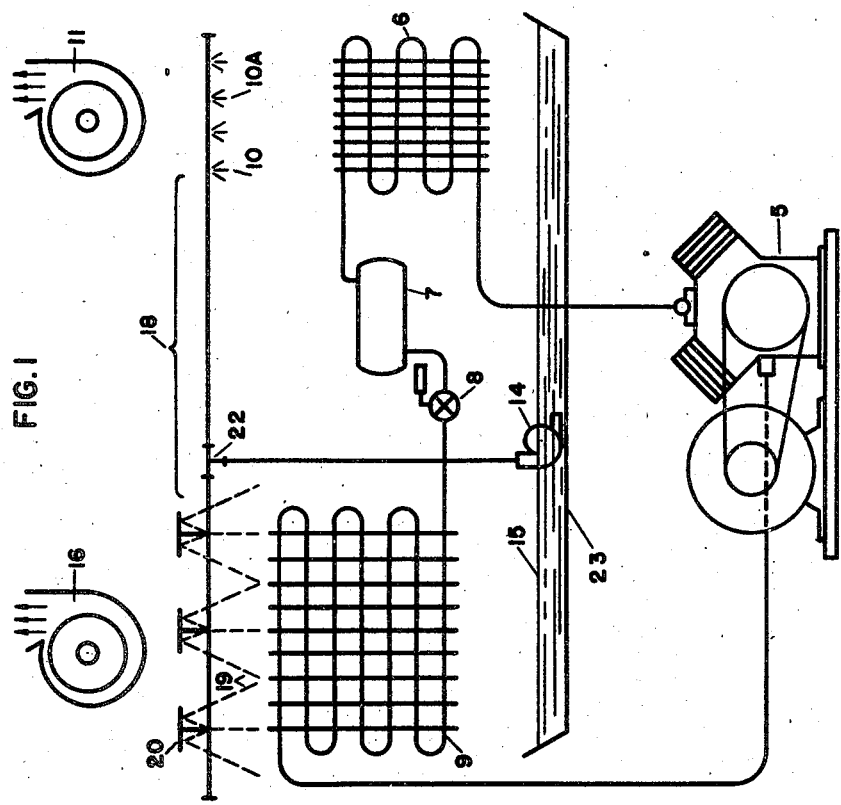
INVENTOR.
SAM F. SHAWHAN
BY
ATTORNEY May 27, 1947.  S. F. SHAWHAN  2,421,293
DEFROSTING METHOD AND APPARATUS
Filed April 9, 1943  2 Sheets-Sheet 2

INVENTOR.
SAM F. SHAWHAN
BY
ATTORNEY

Patented May 27, 1947

2,421,293

UNITED STATES PATENT OFFICE 2,421,293

DEFROSTING METHOD AND APPARATUS

Sam F. Shawhan, Syracuse, N. Y., assignor to Carrier Corporation, Syracuse, N. Y., a corporation of Delaware Application April 9, 1943, Serial No. 482,414

9 Claims. (Cl. 62—129)

This invention relates to a defrosting arrangement.

The general object of the invention is to provide a simple and inexpensive water circulating system, adapted more particularly for use with an evaporative condenser or cooling tower, designed for defrosting coils effectively and with a minimum of equipment.

The use of a water spray in an air stream provides heat interchange between the sensible heat in the air and the water. If water is used at a temperature less than that of the dry bulb temperature of the air, the result will be a rise in the temperature of the water. While some of the water will be evaporated and to that extent dissipate some of the sensible heat absorbed from the air, the body of the water will absorb the greater percentage of the heat in the air. If the temperature of the water is lower than the dew point of the air them the reduction of the temperature of the air will raise the temperature of the water.

A feature of the invention resides in the provision of means for bringing water which has been cooled by circulation over frosted surfaces, in contact with an air stream higher in temperature, with the result that such water will be heated and thereby rendered more effective for further use in defrosting.

Another feature of the invention resides in the provision of means for raising the temperature of water used for defrosting by providing a circuit in which water cooled by contact with frosted coils will be heated by contact with an air stream and by contact with available heat in condenser surfaces, and then recirculated in contact with the frosted coils.

Another feature is the provision of a defrosting arrangement in which water may be used without danger of freezing and without need for special or expensive draining or venting devices.

Another feature of the invention provides for using a multiple water circuit whereby a single supply of water fed from a common sump by a common pump may at one time serve an evaporative condenser or the like during periods when a compressor is in operation, and at another time serve for defrosting evaporator coils when the compressor is inactive.

Another feature resides in the use of a multiple spray arrangement provided with a single valve device through which water sprayed by a common pump may be routed to evaporative condenser sprays during a refrigerating cycle and routed in part to the same sprays and in part to sprays employed for defrosting an evaporator during an off cycle.

These and other features will be apparent from the following description of one form of the invention to be read in connection with the accompanying drawings in which Fig. 1 is a diagrammatic illustration of a refrigerating system equipped with a multiple spray arrangement in accordance with applicant's invention;

Figure 3:
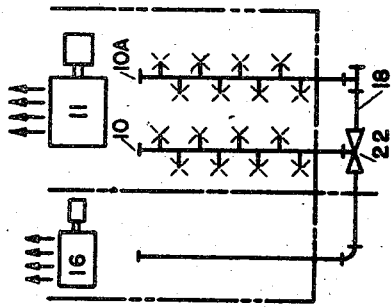
Fig. 3 illustrates diagrammatically the operation of the sprays and fans during periods when the compressor is in operation.

Considering the drawings, similar designations referring to similar parts, numeral 5 is a refrigerating compressor adapted to discharge compressed refrigerant to condenser coils 6 from which the condensed refrigerant feeds into receiver 7, and through expansion valve 8 to evaporator coils 9 and back to the compressor to complete the usual cycle.

For purposes of designation, the term evaporative condenser applies to coils 6 plus sprays 10, 10a and fan 11.

In practice, outside air is admitted into casing 12 through one or more openings 13. Pump 14 supplies water from sump 15 to sprays 10, 10a. The sprays discharge downwardly upon and wet coils 6. The air causes evaporation of the water from the surfaces of the coils and the heat of condensation promotes rapid evaporation as is well known in the art; and fan 11 discharges the moisture laden air as indicated by the arrows out of doors through any desired discharge duct connections, assuming such connections are required.

During normal operations, evaporator coils 9 are not subject to the action of any sprays. In air conditioning applications, a fan, such as 16, will circulate air from any desired source admitted through openings 17, over coils 9, to cool and/or dehumidify the air, and then discharge the air directly into an enclosure through a series of discharge ducts as desired.

In many applications, a suction pressure is employed low enough to cause the corresponding temperature in coils 9 to be below the freezing point. As a result, in the dehumidification of air circulated in contact with coils 9, frosting will occur, with the necessity for removing excessive accumulations of frost in order to avoid undesirable impairment in efficiency.

Various methods of defrosting by the use of water have heretofore been suggested. They have involved the use of complicated or expensive arrangements for venting to assure drainage as well as devices for preventing freezing of water used for defrosting during non-defrosting periods.

Applicant provides for expeditious defrosting, free of expensive or complicated controls, by means of common spray header 18 serving sprays 10, 10a and 19.

Figure 2A:
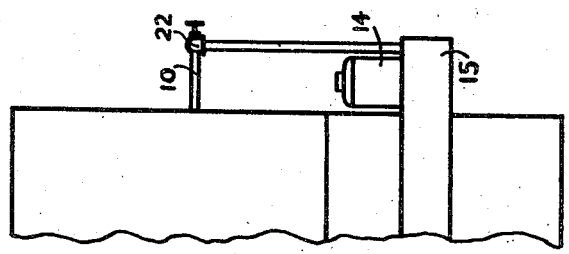
Fig. 2A is a fragmentary view in elevation of the system shown in Figure 2, showing the location of the pump.
Figure 2:
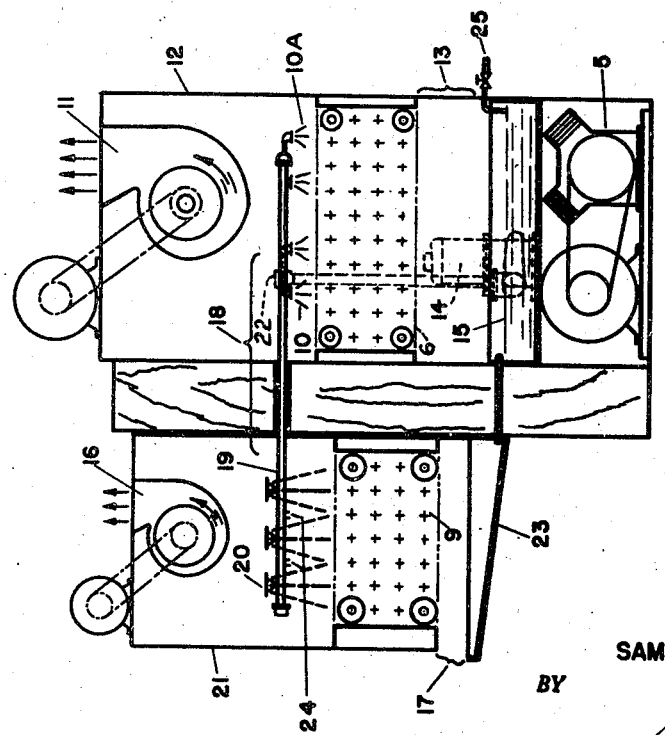
Fig. 2 shows diagrammatically one form of arranging a system for carrying out the invention.

As shown in Fig. 2 the sprays 10, 10a discharge downwardly upon coils 6. However, when in action, the sprays 19 leave the spray header preferably in an upwardly direction to strike targets 20 which then deflect the sprays downwardly upon coils 9. That portion of the header 18 which is within casing 21, which houses the evaporator, is inclined slightly as shown to facilitate drainage thru openings 24 as hereinafter explained.

Figure 4:
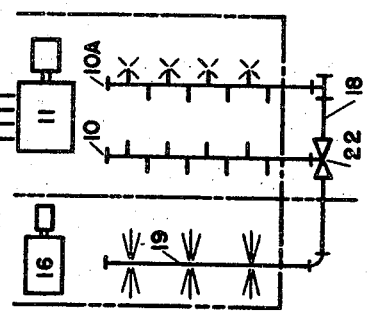
Fig. 4 illustrates diagrammatically the condition of the sprays and fans when the compressor is inactive and defrosting takes place.

Pump 14 feeds water from sump 15 to three-way valve 22. As shown in Figs. 3 and 4 valve 22 feeds water to sprays 10 and 10a during normal operation when the compressor is on, but not to sprays 19. However, when it is desired to defrost coils 9, the valve is set so that only one of the spray sections, 10a, remains in operation and in addition sprays 19 will become operative. Drip pan 23 collects the water and drainage from coils 9, and empties into sump 15.

Assuming that the system is in operation while refrigeration is on, fans 11 and 16 will both be pulling air and sprays 10 and 10a will be active. When it is desired to defrost coils 9, compressor 5 and fan 16 will be shut off. Fan 11 will remain in operation. The valve will be set so that sprays 10 will be turned off and sprays 19 turned on. The water and melted ice dropping from coils 9 upon drip pan 23 will flow into sump 15. It will then be subject to the action of pump 14 and be routed to sprays 10a and 19. However, the use of sprays 10a in casing 12 will accomplish two important purposes. First, it will serve to heat the water from the sump by contact of that portion fed to sprays 10a with the warmer outside air pulled through the casing in contact with the sprays. Second, the water from sprays 10a will also be heated by contact with the condenser to remove such heat as may be imparted by the surfaces of coils 6, and this further serves to raise the temperature of the water in the sump. As a result, a considerable amount of heat will be imparted to the water fed to the sprays 19 to aid in more rapid and efficient defrosting of coils 9.

When defrosting has been completed, the valve 22 is again set to cut out sprays 19 and connect both sections of sprays 10, 10a to the pump. The portion of the header 18 which is in casing 21 is inclined as desired to assure drainage by gravity thru openings 24 which are provided to rid this portion of the header of water. As a result, when defrosting operation is resumed, there will be sufficient space in the upper part of the header within casing 21 so that water will be able to be discharged into the header and soon remove and melt away such inappreciable quantities of ice as may have been formed in the bottom of the header. Element 25 is a water supply line leading to sump 15 in order that the supply of water therein may be renewed as desired.

It will be apparent that the advantages of substantial reheating of the water used for defrosting by contact with warmer air, and the benefits derived from the simple arrangement of spray apparatus, ease of control and inexpensive structure may also be obtained if a cooling tower is employed in applicant's combination rather than an evaporative condenser.

Since the invention is subjected to variations in design and methods of operation without departing from the scope thereof, it is intended that all matter described shall be interpreted as illustrative and not in a limiting sense.

I claim:

1. A method of expediting the removal of accumulations of frost from evaporator surfaces consisting in circulating water in the form of spray over the surfaces during a defrosting operation, simultaneously supplying water in the form of spray into an air stream having a higher temperature than that of the water and melted frost leaving the evaporator, mixing the water from both operations, and then supplying the mixed water in part to the evaporator and in part to the air stream in a repetition of said steps until defrosting is accomplished, and finally cutting off the water fed to the evaporator surfaces.

2. In a system of the character described a heat exchange apparatus, an evaporator, a refrigerant compressor and means connecting said heat exchange apparatus, evaporator and compressor in a closed circuit, a series of spray nozzles and a fan in said apparatus, a second series of spray nozzles for defrosting the evaporator, regulating means for controlling delivery of water to the first series of spray nozzles when the compressor is in operation, said regulating means being adapted to divert water from some spray nozzles of said first series to the second series of spray nozzles when it is desired to defrost the evaporator, and means for draining water from the second series of spray nozzles when defrosting has been completed.

3. A defrosting arrangement of the character described including a first set of spray headers, refrigerant condenser coils disposed in position to be wetted by water spray delivered from said first set of spray headers, the spray passing over said condenser coils being warmed in its passage, a second set of spray headers, evaporator coils disposed in position to receive water spray from said second set of spray headers, the spray passing over said evaporator coils serving to melt frost collected thereon, a sump for receiving warm water from the condenser coils and melted frost from the evaporator coils, and means for supplying water from the sump to both sets of spray headers.

4. A method of defrosting an evaporator which comprises spraying water over refrigerant condenser surfaces while providing a blast of air over the surfaces, the water being raised in temperature by its contact with the condenser surfaces and the blast of air, collecting the warmed water after it has been in contact with the air blast and the condenser surfaces, and then utilizing at least part of said water for defrosting an evaporator by spraying it over the evaporator surfaces.

5. A defrosting arrangement according to claim 3 in which means are provided to discontinue the supply of water to the second set of spray headers.

6. A method of utilizing water in the operation of a refrigeration system during the refrigerating and defrosting cycles which comprises distributing water from a series of spray nozzles supplied from a common source over the surfaces of a condenser in heat exchange relation with a current of air passing over the surface of the condenser, returning at least a portion of the distributed water to the common source, keeping inoperative spray nozzles for distributing water upon evaporator surfaces, continuing such operation during a refrigeration cycle, reducing, when a refrigeration cycle is discontinued, the number of spray nozzles distributing water over the surfaces of the condenser while rendering operative spray nozzles for spraying water upon the evaporator surfaces to defrost the same, and delivering at least a portion of the water from the evaporator surfaces to the common source.

7. In apparatus of the character described, the combination of a first spray header, refrigerant condenser coils disposed in position to be wetted by water spray delivered from said first header, the spray passing over said condenser coils being warmed during its passage, a second spray header, evaporator coils disposed in position to receive water spray from said second spray header, the spray passing over said evaporator coils serving to melt frost collected thereon, a sump for collecting warmed water from the condenser coils and melted frost from the evaporator coils, means for discharging water through openings in the first header in a downward direction, means for discharging water through openings in the second header in an upward direction, means for draining water from the second header so that a space will be provided between any water level in the second header and the openings therein, and means for supplying water from the sump to both spray headers.

8. A method of defrosting evaporator surfaces which comprise providing a blast of air over the condenser surfaces of an evaporative condenser, spraying water from a common sump over the evaporative condenser in contact with said blast of air and the condenser surfaces thereby heating the sprayed water, spraying water from the common sump over the surfaces of the evaporator to remove frost therefrom, collecting the warmed water from the evaporative condenser and the resulting cooled water from the evaporator in the common sump, and repeating the operation as aforesaid.

9. A method of utilizing water in the operation of a refrigeration system for condensing refrigerant under operating refrigeration conditions and for removing frost from the evaporator under other conditions which comprises directing water from a common source to a series of spray nozzles adapted to spray the water over the surfaces of the condenser and the evaporator, spraying water from certain of said nozzles over the surfaces of the condenser in heat exchange relation with a blast of air directed over the condenser surface, at least a portion of the water sprayed over the condenser surfaces being returned to the common source, keeping inoperative spray nozzles for delivering water upon the evaporator surfaces during a refrigeration cycle, cutting out of service a portion of said spray nozzles spraying water over the condenser surfaces and cutting into service the spray nozzles for delivering water upon evaporator surfaces when the refrigeration cycle is discontinued and returning at least a portion of the water delivered upon the evaporator surfaces to the common source.

SAM F. SHAWHAN.

REFERENCES CITED

The following references are of record in the file of this patent:

UNITED STATES PATENTS

| Number | Name | Date |
|---|---|---|
| 2,025,456 | Kagi | Dec. 24, 1935 |
| 2,228,103 | Anderson | Jan. 7, 1941 |
| 2,248,756 | Henney | July 8, 1941 |
| 2,289,035 | Naeson | July 7, 1942 |